Dec. 1, 1959   O. H. LINDSTROM ET AL   2,914,795
APPARATUS FOR LOOSENING AND REMOVING HIDE
FROM THE LEG OF AN ANIMAL
Filed Nov. 10, 1955   2 Sheets-Sheet 1

INVENTORS
OSCAR H. LINDSTROM
JOSEPH A. WANDAS
BY Williamson, Schroeder,
Adams, & Meyers
ATTYS.

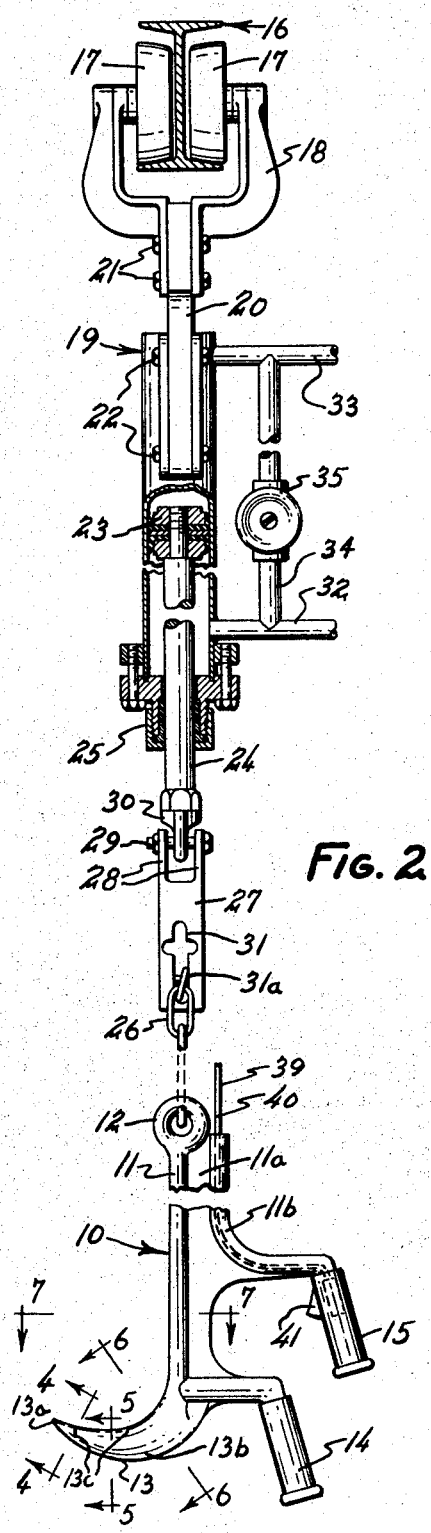
FIG. 4
FIG. 5
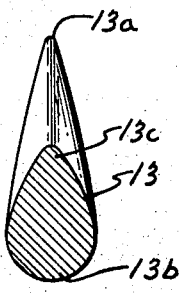
FIG. 6
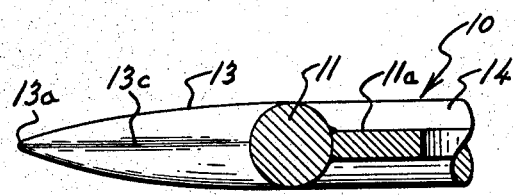
FIG. 7
INVENTORS
OSCAR H. LINDSTROM
JOSEPH A. WANDAS
BY Williamson, Schroeder,
Adams, & Meyers
ATTYS.

United States Patent Office 2,914,795
Patented Dec. 1, 1959

2,914,795

APPARATUS FOR LOOSENING AND REMOVING HIDE FROM THE LEG OF AN ANIMAL

Oscar H. Lindstrom and Joseph A. Wandas, Austin, Minn., assignors to Geo. A. Hormel & Co., Austin, Minn., a corporation of Delaware Application November 10, 1955, Serial No. 546,077

6 Claims. (Cl. 17—21)

This invention relates to apparatus and methods for processing animal carcasses, and more specifically relates to apparatus and methods for loosening and separating the hide from the flesh in the hind leg of a beef animal.

An object of our invention is to provide new and improved apparatus of simple and inexpensive construction and operation for loosening and separating a substantial portion of the hide on the hind leg of a beef animal from the flesh of the leg.

Another object of our invention is to provide a novel apparatus for readily and easily separating the hide of the leg of a beef animal from the flesh thereof in such a manner that the flesh will remain substantially undamaged and in excellent salable condition.

A further object of our invention is to provide improved apparatus which substantially reduces the time required for removing the hide from the leg of a beef animal to the extent that the person charged with the responsibility of performing this job in a packing plant, is freed for also performing other steps in the processing of animal carcasses and thereby very substantially reducing the cost of such processing.

A still further object of our invention is to provide a new method in the art of processing animal carcasses, for loosening and removing the hide from the hind leg of an animal without injuring the flesh of the leg, which method consists in the steps of slitting the hide upwardly of the leg from the knuckle, forcibly separating the hide from the flesh around one side of the leg adjacent the slit to define an initial access opening, progressively separating the hide from the flesh of the leg downwardly along the leg toward the hoof, and simultaneously progressively tearing the hide from the slit downwardly toward the hoof.

These and other objects and advantages of my invention will more fully appear from the following description made in connection with the accompanying drawings wherein like reference characters refer to the same parts throughout the several views and in which:

Fig. 2 is an elevation view of the invention partly in section and partly broken away;

Fig. 4 is a detail cross section view in an enlarged scale of a portion of the invention and taken on a plane substantially at 4—4 of Fig. 2;

Fig. 5 is a detail cross section view in an enlarged scale of a portion of the invention and taken on a plane as indicated at 5—5 of Fig. 2;

Fig. 6 is a detail section view in an enlarged scale of a portion of the invention taken at 6—6 in Fig. 2; and Fig. 7 is a detail section view in an enlarged scale taken substantially at 7—7 of Fig. 2.

Figure 1:
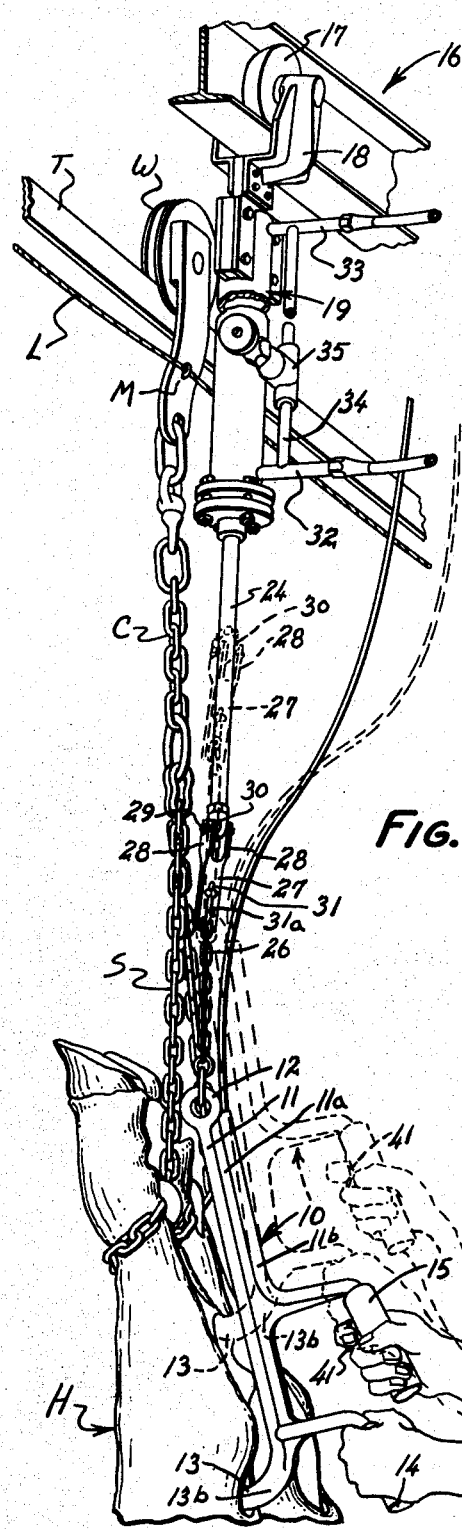
Fig. 1 is a perspective view, partly broken away, of the invention and also showing a portion of the hind leg of a beef animal suspended in a conventional manner.

One embodiment of the present invention is disclosed herein. As best seen in Fig. 1 the hind leg indicated in general by letter H is suspended by suitable means such as shackle S and chain C and wheel W from a track T suitably supported in a packing plant. Suitable means such as line or cable L is attached to the wheel mounting M for pulling the cattle along beneath the track T. As shown, the hind leg H is generally suspended with the distal end thereof and the hoof extending upwardly and the shackle S is secured thereto adjacent to the hoof.

The method steps comprising a portion of the present invention which are related to the art of loosening and separating the hide from the flesh of the hind leg of an animal, include slitting the hide of the leg on the posterior side thereof and several inches above the knuckle or metatarsal joint of the leg. The hide is forcibly separated, by tearing, from the flesh around one side of the leg from the slit in the hide. Then progressively from the initial access slit toward the distal end of the leg or hoof, the hide and flesh are separated while the hide is torn longitudinally of the leg from the slit toward the hoof.

The apparatus comprising a portion of the present invention for accomplishing the method set forth, includes a hook indicated in general by numeral 10 and having an elongated shank 11 which has an eye 12 formed in the upper end portion or connection end thereof. Shank 11, in the form shown, is provided with a rigid reinforcing web 11a affixed to the rear side thereof. Web 11a has a tubular housing 11b affixed to the upper portion thereof for carrying an electrical conductor for purposes hereinafter described. Hook 10 also includes an elongated and curved projection or work element 13 which is affixed to the lower end portion of shank 11 and which extends transversely thereof. The work element 13 is tapered substantially to a point at the outer end 13a thereof to be adapted for projection between the hide and flesh of the animal leg H. The intermediate portions 13b of the work element 13 are of substantially ovate cross section as best seen in Figs. 5 and 6. The acute portion of the ovate cross section is disposed on the inside concave side 13c of the curved hook or work element 13 and provides a thin, blunt hide tearing edge thereon.

The hook 10 is also provided with a pair of gripping handles 14 and 15 which are affixed to the shank 11 for guiding the hook 10 when in operation.

Means are provided for supporting the hook 10 and for forcibly moving the same in a vertical direction. The hook 10 is supported from an "I-type" beam 16 which may be affixed in a conventional manner to a building. A pair of support wheels or rollers 17 are carried on one of the side flanges of the beam 16 and on opposite sides of the central web thereof. Rollers 17 are journalled on a rigid yoke 18 to which is affixed a hydraulic cylinder, indicated in general by numeral 19. A connecting plate 20 is bolted as by bolts 21 and 22 to the yoke 18 and the cylinder 19 respectively. Hydraulic cylinder 19 is of a conventional double acting type and is provided with a vertically reciprocable piston 23 which is secured to a vertically disposed rod 24 which extends through suitable bushings 25 at the lower end of cylinder 19.

A chain 26 is secured to the eyelet 12 at the upper end of shank 11 for supporting the hook 10. Means are provided for adjustably connecting the chain 26 to the piston rod 24, and in the form shown, such means include a rigid connecting element 27 which is formed of heavy steel plate material and which is formed to provide a pair of upstanding arms 28 at the upper end thereof. A pivot bolt 29 extends through suitably provided apertures in arms 28 and a ring 30 which is secured to the lower end of piston rod 24. Keyhole slot 31 is provided at the lower end of connecting element 27 and is similar in configuration to the cross sectional shape of the chain 26 to permit the chain 26 to slide therethrough. The lower portion 31a of the slot 31 is elongated so as to receive a single link of chain 26 therein and preclude longitudinal movement of the chain through the slot.

Figure 3:
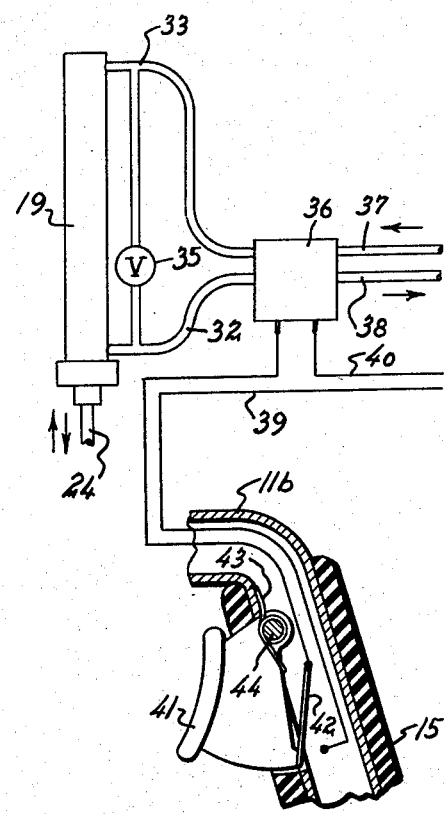
Fig. 3 is a generally diagrammatic view of the control apparatus with the control handle being shown in detail longitudinal section.

Suitable means are provided for connecting hydraulic cylinder 19 to a source of hydraulic fluid pressure and for controlling the application of hydraulic fluid pressure to the cylinder. In the form shown, a pair of hydraulic fluid conduits 32 and 33 are respectively connected in fluid communicating relation to the lower and upper end portions of cylinder 19. An interconnection between conduits 32 and 33 is provided by a conduit 34 which has a manually controllable valve 35 disposed therein. As best seen in Fig. 3 the conduits 32 and 33 are connected to a solenoid operated hydraulic fluid valve 36 which may be of any conventional type which is adapted to reverse the connections to the conduits 32 and 33 when actuated. A source of hydraulic fluid pressure 37 is connected to the valve 36 and a fluid return 38 is also connected thereto. Solenoid valve 36 is electrically connected by conductors 39 and 40 to a suitable source of electric power for operating the solenoid valve 36. A control mechanism is provided for controlling the operation of solenoid valve 36 and in the form shown, a finger operated control element 41 is swingably mounted in the handle 15 of hook 10 for controlling the operation of a switch 42 which is disposed in the conductor 39. Switch 42 may be of any conventional type. A suitable coil spring 43 may be provided on the pivot mounting 44 of control element 41 for normally urging the control element 41 into the position shown.

The solenoid operated valve 36 normally connects the source of fluid pressure 37 to the conduit 33 and the upper end of hydraulic cylinder 19 when the solenoid is de-energized. The conduit 32 and the lower end of cylinder 19 is normally connected to the fluid return 38. When the switch 42 is closed to operate the solenoid valve 36, the source of fluid pressure 37 is connected to the conduit 32 and the lower end of hydraulic cylinder 19 and the conduit 33 and the upper end of cylinder 19 is connected to the fluid return 38. This causes retraction of the piston rod 24 and driving of the hook 10 in an upward direction.

In operation, the piston rod 24 is normally extended to position the hook 10 in its downwardly shifted position. The handles 15 are manually gripped and the projection or work element 13 is inserted through the slit in the hide of the leg H and along one side of the leg between the flesh and the hide. The work element 13 is inserted inwardly as far as possible. While the operator of the hook continues to hold the work element inwardly as far as possible in the animal leg H, he will shift the finger-operated control element 41 to operate the solenoid valve 36. When the valve 36 is operated, the hydraulic cylinder 19 quickly retracts the piston rod 24 as the piston 23 in the cylinder is driven upwardly. This causes the hook 10 to be pulled upwardly, and in a direction longitudinally of the animal's leg H. As the hook 10 is moved upwardly the work element or projection 13 of hook 10 forcibly separates the hide from the flesh of the leg. Because of the ovate shape of the projection 13, the acute inner side 13c will push the hide and flesh away from each other progressively toward the hoof. Substantially none of the flesh of the leg will be torn away with the hide and the flesh of the leg will remain in good condition.

As the hook 10 is moved upwardly, the hide of the leg H is torn along a line extending from the slit toward the hoof. After the hook has been pulled upwardly to the limit of its upward movement, it will again be lowered and the projection 13 will be inserted through the slit and between the hide and flesh on the other side of the leg. The hide and flesh of the leg will be separated on this second side of the leg in a manner similar to that previously described. When the hide has been loosened from the leg on both sides thereof, it may easily be removed without having caused any damage to the flesh of the leg.

Of course the procedure in loosening and separating the hide from the flesh will be repeated on the other hind leg of the animal.

It should be noted that we have provided new and improved apparatus for readily and easily loosening and separating the hide from the flesh of the hind leg of an animal in a manner which substantially precludes the damaging of the flesh of the leg and which also substantially reduces the time necessary to perform this function in the dressing of a carcass.

It should also be apparent that we have provided a new and improved method in the art of loosening and removing the hide from the flesh of the hind leg of an animal which substantially reduces the time and effort required for the performance of this part in the processing of an animal carcass and substantially reduces the cost of said processing.

It will, of course, be understood that various changes may be made in the form, detail, arrangement and proportion of the parts without departing from the scope of my invention which consists of the matter described herein and set forth in the appended claims.

What is claimed is:

1. A device for separating the hide from the flesh of an animal leg which comprises a hook-like element having an elongated shank portion and a substantially normally extending work portion, said work portion having a thin blunted hide tearing edge on the inside thereof, and at least one hook controlling means operatively connected to said elongated shank.

2. A device for separating the hide from the flesh of an animal leg which comprises a hook-like element having an elongated shank portion and a substantially normally extending work portion, said work portion having a cross section which is substantially ovate with the acute side of the ovate portion being disposed on the inside of said work portion and at least one hook controlling means operatively connected to said elongated shank on the side thereof generally opposite to said work portion.

3. The structure set forth in claim 2 and controllable power means connected to said hook-like element for longitudinally moving same and a control member carried by said shank and connected in controlling operating relation with said power means.

4. A device for separating the hide from the flesh of an animal's leg which comprises a hook-like element having an elongated shank portion and a substantially normally extending curved work portion the concave side of which is disposed on the inside of said work portion, said work portion being tapered substantially to a point at its outer end and being substantially ovate in cross section with the acute side of the ovate portion being disposed on the inside of said work portion and at least one hook controlling means operatively connected to said elongated shank on the side thereof generally opposite to said work portion.

5. A device for separating the hide from the flesh of an animal's leg which comprises a hook-like element having an elongated shank portion and a substantially normally extending work portion, said work portion having a cross section which is substantially ovate with the acute side of the ovate portion being disposed on the inside of said work portion, a pair of gripping handles fixed to said elongated shank on the sides thereof generally opposite to said work portion for manipulating said element, controllable power means connected to said hook-like element for longitudinally moving the same and a manually operable control element mounted on one of said handles for controlling the operation of said power means.

6. Apparatus for separating hides from the flesh of the leg of an animal which is suspended by suitable means secured to the lower portion of the leg adjacent the hoof, said apparatus comprising a hook-like element having an elongated shank portion and a substantially normally extending work portion, said work portion having a cross section which is substantially ovate with the acute side of the ovate portion being disposed on the inside of said work portion and at least one hook controlling means operatively connected to said elongated shank on the sides thereof generally opposite to said work portion, means connected with said shank for suspending the same adjacent the leg of such animal, said means including controllable power lift means for pulling said hook-like element upwardly and an adjustable connection element having a key slot and including a chain removably fitting into the slot for adjustably positioning said hook-like element relative to the vertical position of the animal leg.

References Cited in the file of this patent

UNITED STATES PATENTS

| | | |
|---|---|---|
| 1,642,625 | Norton | Sept. 13, 1927 |
| 2,496,394 | Hincks | Feb. 7, 1950 |
| 2,544,437 | Stow | Mar. 6, 1951 |
| 2,585,408 | Roberson | Feb. 12, 1952 |
| 2,613,903 | Platz | Oct. 14, 1952 |
| 2,617,548 | Falkner | Nov. 11, 1952 |
| 2,620,160 | Ray | Dec. 2, 1952 |
| 2,654,122 | Derby | Oct. 6, 1953 |

FOREIGN PATENTS

| | | |
|---|---|---|
| 668,537 | Great Britain | Mar. 19, 1952 |